US009128825B1

(12) United States Patent
Albrecht et al.

(10) Patent No.: US 9,128,825 B1
(45) Date of Patent: Sep. 8, 2015

(54) OPTIMIZING ALLOCATION OF FLASH MEMORY TO FILE GROUPS

(71) Applicant: GOOGLE INC., Mountain View, CA (US)

(72) Inventors: Christoph Albrecht, Mountain View, CA (US); Murray Stokely, Mountain View, CA (US); Arif Merchant, Mountain View, CA (US); Christian Eric Schrock, Mountain View, CA (US); Xudong Shi, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 236 days.

(21) Appl. No.: 13/897,159

(22) Filed: May 17, 2013

(51) Int. Cl.
*G06F 12/02* (2006.01)

(52) U.S. Cl.
CPC ............ *G06F 12/0246* (2013.01); *G06F 12/02* (2013.01); *G06F 12/0253* (2013.01)

(58) Field of Classification Search
CPC ...................................................... G06F 12/02
USPC ........................................................ 711/103
See application file for complete search history.

(56) References Cited

U.S. PATENT DOCUMENTS

| 8,010,738 | B1* | 8/2011 | Chilton et al. ................. 711/103 |
| 2009/0292861 | A1* | 11/2009 | Kanevsky et al. ............. 711/103 |
| 2013/0151581 | A1* | 6/2013 | Leggette et al. .............. 709/201 |
| 2013/0185530 | A1* | 7/2013 | Puttaswamy Naga et al. ............................. 711/162 |
| 2013/0219144 | A1* | 8/2013 | Oe et al. ......................... 711/165 |
| 2013/0290248 | A1* | 10/2013 | Fukatani et al. .............. 707/610 |
| 2014/0122542 | A1* | 5/2014 | Barnes et al. ................. 707/822 |

OTHER PUBLICATIONS

Aguilera et al., "Improving recoverability in multi-tier storage systems," 37th Annual IEEE/IFIP International Conference on Dependable Systems and Networks, Edinburgh, UK, Jun. 25-28, 2007, pp. 677-686.
Alvarez et al., "Minerva: An Automated Resource Provisioning Tool for Large-Scale Storage Systems," ACM Transactions on Computer Systems, vol. 19, No. 4, Nov. 2001, pp. 483-518.
Anderson et al., "Quickly Finding Near-Optimal Storage Designs," ACM Transactions on Computer Systems, vol. 23, No. 4, Nov. 2005, pp. 337-374.

(Continued)

*Primary Examiner* — Cheng-Yuan Tseng
*Assistant Examiner* — Zubair Ahmed
(74) *Attorney, Agent, or Firm* — Birch, Stewart, Kolasch & Birch, LLP

(57) ABSTRACT

Systems and methods are discussed relating to allocation of memory from a fixed pool of fast memory within a data center having a data storage area equipped with that memory. Techniques include: receiving a request to write data in the storage area; identifying a file group associated with the write request; analyzing previous data activity traces associated with the file group; determining an available fast memory amount based on the total amount of fast memory in the fixed pool and a currently allocated amount of fast memory; determining a fast memory allocation for the file group based on the previous data activity traces, the available fast memory, and a fast memory constraint, the memory allocation including an allocation amount and a write probability; and providing information about the memory allocation to a file system of the data center, which writes the data based on the allocation amount and write probability.

25 Claims, 7 Drawing Sheets

(56) References Cited

OTHER PUBLICATIONS

Anderson et al., "Selecting RAID levels for disk arrays," Proceedings of the 1st Conference on File and Storage Technologies (FAST '02), Monterey, CA, Jan. 28-30, 2002, pp. 189-201.

Baker et al., "Measurements of a Distributed File System," SIGOPS OS Rev., vol. 25, No. 5, 1991, pp. 198-212.

Batra, "Maximize Operational Efficiency in a Tiered Storage Environment," Hitachi Data Systems, May 2012, 11 pages.

Blaze, "Caching in large-scale distributed file systems," PhD Thesis, Princeton University, Jan. 1993, pp. i-xi and 1-89.

Chang et al., "Bigtable: A Distributed Storage System for Structured Data," USENIX Assn., OSDI '06: 7th USENIX Symposium on Operating Systems Design and Implementatiion, Seattle, Washington, Nov. 2006, pp. 205-218.

Coehlo et al., "Uncertainty in Aggregate Estimates from Sampled Distributed Traces," MAD '12: 2012 Workshop on Managing Systems Automatically and Dynamically, Hollywood, CA, Oct. 2012, USENIX, pp. 1-7.

Dufrasne et al., "IBM System Storage Solutions for Smarter Systems," IBM Redbooks, International Technical Support Organization, Jul. 2011, pp. i-xiv and 1-242.

Gaonkar et al., "Designing Dependable Storage Solutions for Shared Application Environments," IEEE Transactions on Dependable and Secure Computing, vol. 7, No. 4, Oct.-Dec. 2010, pp. 366-380.

Gasior, "SSD prices down 38% in 2012, but up in Q4," http://techreport.com/review/24216/ssd-prices-down-38-in-2012-but-up-in-q4, 2013, 4 pages.

Ghemawat et al., "The Google File System," SOSP '03: Proceedings of the 19th Symposium on Operating Systems Principles, Bolton Landing, NY, Oct. 2003, ACM, pp. 29-43.

Gray et et al., "The 5 Minute Rule for Trading Memory for Disc Accesses and the 10 Byte Rule for Trading Memory for CPU Time," SIGMOD '87: Proceedings of the 1987 SIGMOD International Conference on Management of Data, ACM, San Francisco, CA, 1987, pp. 395-398.

Guerra et al., "Cost Effective Storage using Extent Based Dynamic Tiering," FAST, 2011, pp. 273-286 (14 pages).

Kroeger et al., "Design and Implementation of a Predictive File Prefetching Algorithm," Proceedings of the 2001 USENIX Annual Technical Conference, Boston, Massachusetts, Jun. 25-30, 2000, pp. 105-118.

Laliberte, "White Paper: Automate and Optimize a Tiered Storage Environment—FAST!", Enterprise Stategy Group, Dec. 2009, pp. 1-9.

Loboz, "Cloud Resource Usage—Extreme Distributions Invalidating Traditional Capacity Planning Models," Proceedings of the 2nd International Workshop on Scientific Cloud Computing, San Jose, CA, Jun. 2011, ACM, pp. 7-14.

Massiglia, Symantec Corporation, "Exploiting multi-tier file storage effectively," SNIA, 2009, pp. 1-33.

McKusick et al., "GFS: Evolution on Fast-Forward," Communications of the ACM, vol. 53, No. 3, Mar. 2010, pp. 42-49.

Narayanan et al., "Migrating Server Storage to SSDs: Analysis of Tradeoffs," EuroSys '09, Proceedings of the 4th ACM European Conference on Computer Systems, Nuremberg, Germany, Apr. 2009, ACM, pp. 145-158.

Oh et al., "Caching less for better performance: Balancing cache size and update cost of flash memory cache in hybrid storage systems," Proceedings of the 10th USENIX Conference on File and Storage Technologies, 2012, 17 pages.

Ousterhout et al., "A Trace-Driven Analysis of the Unix 4.2 BSD File System," Proceedings of the 10th ACM Symposium on Operating Systems Principles, SOSP '85, New York, NY, 1985, pp. 15-24.

Patterson et al., "A Status Report on Research in Transparent Informed Prefetching," ACM SIGOPS Operating Systems Review, vol. 27, No. 2, 1993, pp. 21-34.

Sigelman et al., "Dapper, a Large-Scale Distributed Systems Tracing Infrastructure," Google Technical Report dapper-2010-1, Apr. 2010, pp. 1-14.

Stokely et al., "Projecting Disk Usage Based on Historical Trends in a Cloud Environment," ScienceCloud '12: Proceedings of the 3rd International Workshop on Scientific Cloud Computing, Delft, The Netherlands, Jun. 18, 2012, ACM, pp. 63-70.

Watanabe, "Solaris 10 ZFS Essentials," Sun Microsystems Press, Prentiss Hall, First Printing: Dec. 2009, Copyright 2010, pp. i-xv and 1-124.

Wilkes et al., "The HP AutoRAID hierarchical storage system," ACM Transactions on Computer Systems, vol. 14, No. 1, Feb. 1996, pp. 108-136 (29 pages).

* cited by examiner

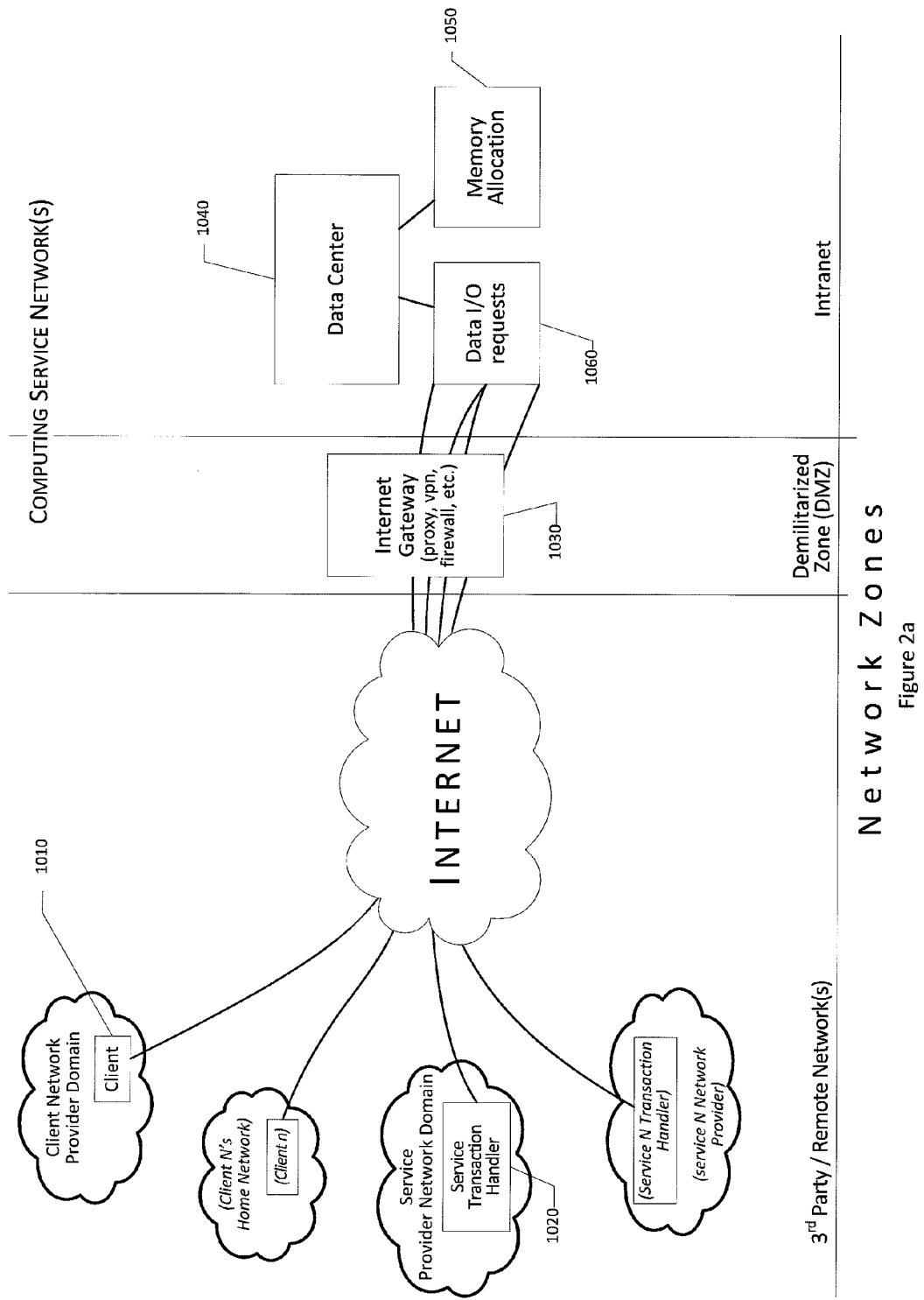

OPTIMIZING ALLOCATION OF FLASH MEMORY TO FILE GROUPS

BACKGROUND

Given a limited amount of flash memory in a data center, it becomes necessary at times to divide that pool of memory between different file owners/file groups to maximize the fraction of reads going to flash rather than disks. This need may arise because disk drives and flash memory have different characteristics. Flash memory can support a much higher read rate than disk drives, but it is more expensive per byte and wears out after much more quickly than a disk drive. A data center is likely to have a lot of disk capacity available but, due to the cost, relatively little flash memory—perhaps only 1% of the disk capacity, or even less. It is therefore preferable if the most accessed files reside in flash, while less frequently used files are placed on disk. This allows the data center to quickly access the more frequently-used data without putting excess strain on the available flash memory.

Since files are most heavily read soon after they are written, one way to ensure that the most read files are in flash is to write the files first to flash, and to move them to disk in a first-in first-out (FIFO) order as the flash memory fills up. However, it is also known that different users' files and different file groups have different characteristics—some files, such as log files, are seldom read. The FIFO placement method does not distinguish between the types of files or their owners, and is therefore sub-optimal. It would be preferable to allocate different amounts of flash memory to different file groups depending upon their usual workloads. Such an allocation scheme, however, requires determining, on an on-going basis, how much flash memory to allocate to each file group or user.

SUMMARY

It would be preferable to allocate different amounts of flash memory to different file groups depending upon their usual workloads. Such an allocation scheme, however, may require determining, on an on-going basis, how much flash memory to allocate to each file group or user.

Embodiments of techniques and solutions disclosed herein may pertain to a method of allocating memory resources from a fixed pool of fast access memory within a data center having a data storage area equipped with slow access memory and the fixed pool of fast access memory, the method comprising: receiving a data write request to write data in the data storage area of the data center; identifying a file group associated with the received data write request; analyzing previous data activity traces associated with the identified file group; determining an available fast access memory amount based on the total amount of fast access memory in the fixed pool and a currently allocated amount of fast access memory; determining a fast access memory allocation for the identified file group based on the previous data activity traces, the available fast access memory amount, and a fast memory access constraint, the fast access memory allocation including a fast access memory allocation amount and a fast access memory write probability representing a probability that data associated with the data write request will be written to the fast access memory included in the allocation amount; and providing information about the determined fast access memory allocation to a file system of the data center such that the file system performs the data write request based on the determined fast access memory allocation amount and the determined fast access memory write probability.

In some embodiments, the memory allocation further includes a time to live (TTL) that governs how long data from the write request that is written to the fast access memory included in the determined fast access memory allocation amount may remain in the fast access memory before being evicted to the slow access memory.

In some embodiments, the step of analyzing previous data activity traces includes analyzing previous data activity of a user or application associated with the identified file group.

In some embodiments, the fast memory access constraint is a maximum permitted memory write rate that establishes an upper bound on how much data may be written to the fast access memory within a given time period.

In some embodiments, the step of determining a fast access memory allocation includes solving an optimization problem based on the trace data, the total amount of available fast access memory, and the maximum permitted memory write rate in order to determine the fast access memory write probability.

In some embodiments, the step of analyzing previous data activity traces includes: collecting samples of data operations representing data read and data write activity for files within the data center; identifying, within the samples, the file group associated with each sampled data operation; generating, for each file group, histograms comparing file age to file size and comparing file age to a number of read operations associated with a file; and creating a data activity trace for a particular file group based on the generated histograms.

In some embodiments, the step of analyzing previous data activity traces associated with the identified file group includes analyzing all created data activity traces for all file groups currently associated with an allocated amount of fast access memory from the fixed pool.

In some embodiments the file system is a replicated file system that writes two or more copies of the data of the write request in response to the data write request; and embodiments of the method further include: determining, based on the fast access memory write probability, whether any one of the two or more copies should be written to fast access memory; and writing only one of the two or more copies to fast access memory in response to determination that one of the two or more copies should be written to fast access memory.

In some embodiments the fast access memory is flash memory and the slow access memory is disk memory; and embodiments of the method include evicting the written data from flash memory and writing the evicted data to disk memory when the TTL associated with the written data expires.

In some embodiments the fast access memory is flash memory and the slow access memory is disk memory; and embodiments of the method further include writing at least one of the two or more copies of the data of the write request to disk memory in response to the data write request.

In some embodiments, the optimization problem is a linear programming problem.

In some embodiments, the step of determining a fast access memory allocation for the identified file group based on the previous data activity traces includes predicting an available number of fast access memory reads based on an amount of total memory allocated to the identified file group.

In some embodiments the file system is a parity-encoded file system where parity-encoded data is data that is stored with parity codes to provide redundancy, and where the fast access memory write probability is applied to a data or systematic portion of the parity-encoded data; and embodiments of the method further include: determining, based on the fast access memory write probability, whether the data or systematic portion of the parity-encoded data should be written to fast access memory; and writing the data or systematic portion of the parity-encoded data to fast access memory in response to determination that the data or systematic portion of the parity-encoded data should be written to fast access memory.

In some embodiments, the step of determining, based on the fast access memory write probability, whether the data or systematic portion of the parity-encoded data should be written to fast access memory includes determining whether at least some of the parity codes associated with the data or systematic portion should be written to fast access memory along with the data or systematic portion.

In some embodiments, the step of writing the data or systematic portion of the parity-encoded data to fast access memory includes writing said at least some of the parity codes to fast access memory in response to a determination that at least some of the parity codes associated with the data or systematic portion should be written to fast access memory along with the data or systematic portion.

Embodiments of techniques and solutions disclosed herein may pertain to a system comprising a processor disposed within a data center; a data storage area disposed within the data center, the data storage area including a pool of slow-access memory and a fixed-size pool of fast-access memory; and a processor-readable memory having embodied thereon instructions causing the processor to perform a method of allocating memory resources from the fixed pool of fast access memory, the method comprising: receiving a data write request to write data in the data storage area of the data center; identifying a file group associated with the received data write request; analyzing previous data activity traces associated with the identified file group; determining an available fast access memory amount based on the total amount of fast access memory in the fixed pool and a currently allocated amount of fast access memory; determining a fast access memory allocation for the identified file group based on the previous data activity traces, the available fast access memory amount, and a fast memory access constraint, the memory allocation including a fast access memory allocation amount and a fast access memory write probability representing a probability that data associated with the data write request will be written to the fast access memory included in the allocation amount; and providing information about the determined fast access memory allocation to a file system of the data center such that the file system performs the data write request based on the determined fast access memory allocation amount and the determined fast access memory write probability.

In some embodiments, the system may be configured to perform some or all or portions of any or all of the method steps and embodiments thereof as discussed and described herein.

Embodiments of techniques and solutions disclosed herein may pertain to a non-transitory processor-readable medium having embodied thereon instructions which, when executed by a processor, cause the processor to perform a method of allocating memory resources from a fixed pool of fast access memory within a data center having a data storage area equipped with slow access memory and the fixed pool of fast access memory, the method comprising steps and configurations as described in some or all of the embodiments discussed and described herein.

Further scope of applicability of the systems and methods discussed will become apparent from the detailed description given hereinafter. However, it should be understood that the detailed description and specific examples, while indicating embodiments of the systems and methods, are given by way of illustration only, since various changes and modifications within the spirit and scope of the concepts disclosed herein will become apparent to those skilled in the art from this detailed description.

BRIEF DESCRIPTION OF THE DRAWINGS

The systems and methods discussed will become more fully understood from the detailed description given herein below and the accompanying drawings that are given by way of illustration only and thus are not limitative.

FIG. 2a shows a block diagram of an embodiment of a network-accessible data center suitable for a flash memory allocation process as described herein;

The drawings will be described in detail in the course of the detailed description.

DETAILED DESCRIPTION

The following detailed description refers to the accompanying drawings. The same reference numbers in different drawings identify the same or similar elements. Also, the following detailed description does not limit the concepts discussed. Instead, the scope of the concepts discussed herein is defined by the appended claims and equivalents thereof.

Embodiments of disclosed herein may pertain to systems and methods for allocating limited flash memory to file users or file groups within a distributed data center, or across multiple data centers, so that the flash hit rate (the fraction of reads going to flash) is maximized. Embodiments of file groups may include files belonging to a particular user, or the files pertaining to a particular application. Embodiments of files may include individual files such as photographs or documents, or may include large-scale files such as database tables, entire databases, or even larger aggregations of data.

Embodiments of users may include individual users or applications or varying scales of aggregated users or applications. In some embodiments, a distributed, network-based file upload and/or file sharing application such as a photograph upload and sharing site may be regarded as either a user or an application or both. For purposes of this discussion, individual or aggregated users and/or applications will be considered as applying a workload to a distributed data storage system. The workload may include one or more files or file groups that are to be written to or otherwise stored in the distributed data storage system.

In some embodiments, an upper bound may be established on the write rate to the flash memory. Such an upper bound may be designed to prevent the flash memory from wearing out before its design lifetime. Some embodiments may replace flash and disk memory with other forms of comparatively fast and slow access memory to realize the same or similar outcomes as described herein. In some embodiments, flash memory may be replaced with buffers or random-access memory (RAM) or re-writable optical media. In some embodiments, disk memory may include or be replaced with optical media, solid-state memory, or magnetic media such as tapes or diskettes or hard drives.

Embodiments of solutions for allocation of limited pools of such fast-access memory in large-scale data storage and data access systems may include three distinct aspects: a data collection pipeline, a data allocation optimization process, and a file system management aspect. An embodiment of a solution for allocation of limited pools of fast-access memory is depicted in FIG. 1a.

Figure 1A:
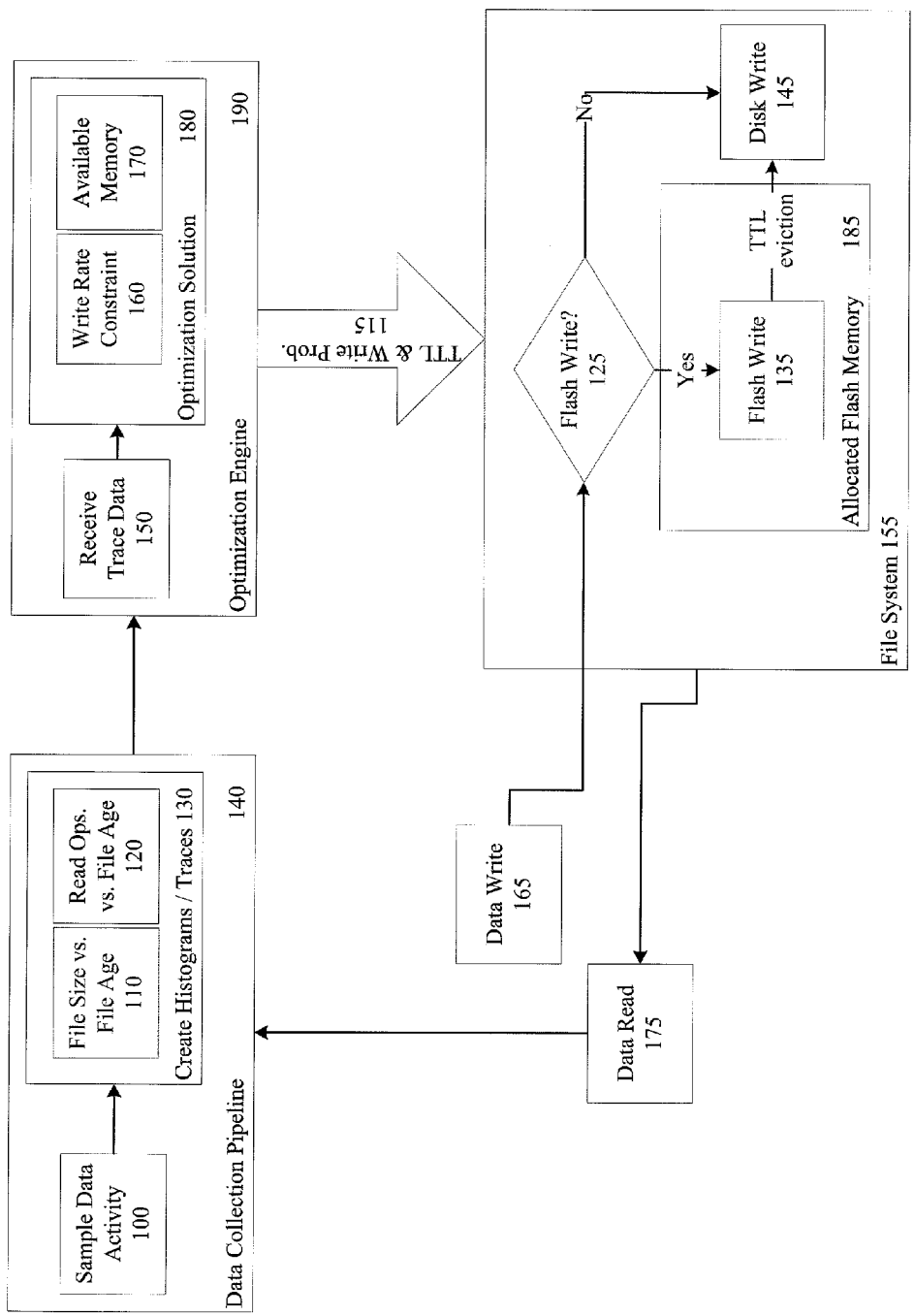
FIG. 1a shows a block diagram of an embodiment of a flash memory allocation process as described herein.

A data collection pipeline 140 of the type shown in FIG. 1a may include physical features such as network connections, servers, data centers, wired and/or wireless data connections, system buses, buffers, data processors, routers, RAM, and other aspects of computers, computing systems, databases, database systems, networks, and network data exchange systems. A file group associated with a workload may be transferred into one or more data storage portions of a data center through a data collection pipeline or pipelines. In some embodiments, a data collection pipeline 140 may provide data to a replicated storage solution within a data center, with multiple versions of each file or file group being created as part of transferring or copying or sending the file(s) or file group(s) to the data center. Embodiments of a data collection pipeline may include capabilities for measuring or monitoring data input and output (I/O) 100, including historical I/O usage patterns for particular files and/or file groups.

Embodiments of a data collection pipeline may, on an on-going basis, measure the recent historical IO usage pattern for each workload or file group. Embodiments of such measurements could be exact or sampled (i.e., some known fraction of the IOs are randomly sampled). In very large scale database or data center systems, sampled measurement 100 may be required due to the sheer volume of information and the relative impossibility of collecting and analyzing exact data across one or more data centers in a timely fashion. Sampling of data activity may be realized by monitoring activity such as remote procedure calls (RPCs) and identifying those associated with data read 175 and/or data write 165 operations affecting one or more physical memory portions of a data storage system or device.

The "user" in some embodiments may be a large entity such as a company or may be a program (or both). A web-based photograph editing and sharing application, for example, may be considered as a "user" for optimization analysis. Since all the read 175 and write 165 operations of such a large-scale user cannot easily be captured or analyzed at a particular point in time—especially in a distributed file system—a sampling 100 may be taken of all remote procedure call (RPC) activity in the file system 155 that goes to low-level storage. In some embodiments, such a series of samples, taken over time, may be called a trace or an activity trace. Any one particular sample may be a sample or complete snapshot of a particular workload.

Embodiments of usage sampling may be continuous or may occur at a particular frequency, such as once every several seconds or minutes. In some embodiments of a data collection pipeline, after each sampling interval or each series of sampling intervals, the distribution of read rates may be estimated for each file group as a function of file age and the distribution of bytes stored as a function of file age.

In sampled embodiments, read rates for a particular file group may be sampled randomly or may be sampled on a per-workload basis. In random sampling embodiments, historical data may tend to reveal the workloads having the comparatively largest number of data read operations. Such workloads may be tied back to a particular user or application based on a frequency with which a particular user or application may appear in the sample data. In such random sampling embodiments, those applications or users which occur most frequently in sample data may be the applications or users that may benefit most from having their workloads subject to a memory allocation optimization due to the intensity and frequency of their data read operations.

In some embodiments, these sampled distributions of read rates may be expressed as histograms 130. Such histograms may show, for all files in a given file group, correlations between file size and file age 110 and/or correlations between a number of read operations associated with a file and the file age 120. File age may represent an amount of time that a file has been stored in a particular memory area, such as a specific flash memory or disk memory address or set of addresses. In some embodiments, file age may also include information about the total age of the file as of its creation date.

In some embodiments, such histograms may also be aggregated to compare overall levels of data read reads between different applications or users associated with the sampled file groups. Embodiments of such histograms 130 may then be used, either individually or in aggregate, to solve an optimization problem related to distribution and allocation of flash memory to store certain file groups or file group portions based on the distribution of data read rates.

In some embodiments, the generated histograms and/or traces 130 may be given to an optimization engine 190 along with known constraints on flash memory 160, 170. Known constraints may include a limit on the amount of available or allocable flash memory 170 and a maximum total write rate 160. Such constraint information may be required in systems having a fixed pool of flash memory because although a particular usage pattern for a user and/or for the overall system may change, the amount of flash memory in such a system remains the same. Allocation of flash in such systems is therefore constrained not only by the activity of a particular user, but by the activity of other users competing for the same limited resource pool.

Embodiments of an optimization process may be realized by constructing an optimization problem to determine for each file group (1) the maximum amount of flash that should be allocated for the file group, and (2) a flash write probability for the file group. In some embodiments, the optimization process may be embodied in an optimization engine 190 which may be represented as a specialized data processor or, in some embodiments, as one or more units of data processing capability otherwise available in a data center configured or otherwise arranged to carry out an optimization process.

Figure 1B:
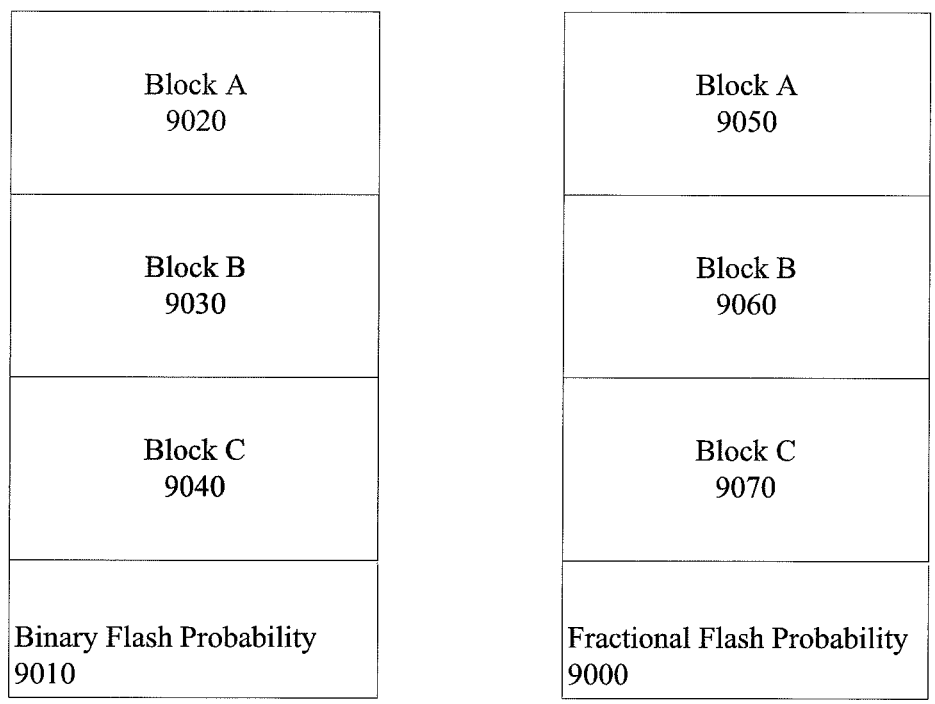
FIG. 1b shows a block diagram of an embodiment of flash write probability configuration process as described herein.

The flash write probability may be 0, 1 or fractional. This represents a likelihood that a file group or portion thereof will be written to flash. A fractional flash write probability may be understood by the following example shown in FIG. 1b. In the figure, two areas of flash memory are depicted: an area having a binary write probability 9010 and an area having a fractional write probability 9000. For the area having binary write probability 9010, there are three blocks of data depicted: Block A 9020 has data with an age of between 20 and 30 and a read rate of 45, Block B 9030 has data with an age of between 10 and 20 and a read rate of 15, and Block C 9040 has data with an age of between 0 and 10 and a read rate of 30. The numbers used herein are for illustrative purposes and do not necessarily depict a particular time scale, data throughput rate, or any specific units. Although this example is predicated on a constant user write rate in the period 0-30 time units in the past (so that blocks A, B, and C have equal numbers of writes), extensions of this example to situations with variable or varying write rates are readily realized.

In the embodiment shown, the binary write probability flash area 9010 has a flash write probability of 1 for blocks B 9030 and C 9040. This means that all data younger than age 20 is stored in flash memory, resulting in a flash read rate of 45.

The area with fractional flash write probability 9000 also shows three blocks of data depicted: Block A 9050 has data with an age of between 20 and 30 and a read rate of 45, Block B 9060 has data with an age of between 10 and 20 and a read rate of 15, and Block C 9070 has data with an age of between 0 and 10 and a read rate of 30. By setting the flash write probability to be ⅔ for all three blocks, less new data is placed in flash and the data placed into flash is kept longer (until age 30 in the embodiment shown). This results in an overall flash read rate of 60 because ⅔ of the reads to Block A 9050 are now occurring in flash. Additionally, the flash write rate actually decreases by ⅓. This is because only ⅔ of incoming data is written to flash and now allowed to remain until age 30 in the fractional flash write probability embodiment 9000 as compared to 100% of incoming data being written to flash and then being evicted at age 20 in the binary flash write probability embodiment 9010. The net result of the fractional flash write probability is therefore both an increased flash read rate and a decreased flash write rate for a given fixed pool of flash memory.

In replicated data embodiments, the flash write probability represents a likelihood that any one replicated version of a file group or portion thereof will be written to flash. In some replicated embodiments, only one replicated version of a file group or file portion may be written to flash, with the other replicated versions going to disk.

In embodiments where data is stored with parity codes to provide redundancy, the data (or systematic) portion of the encoded data may be written to flash, with some or all of the parity codes written to disk. In such embodiments, the write probability may then apply only to the portion of the encoded data that would have been sent to flash.

The flash write probability is utilized in some embodiments because, in embodiments of distributed file systems, insertion on write operations are less computationally expensive to perform than insertion on read operations. Insertion on write means that a file group or file portion is inserted into flash memory upon being written to the data center. The data is then permitted to remain in flash for a certain period of time before being moved to disk.

Returning to FIG. 1a, in some embodiments, constraints may be applied to the optimization. Embodiments of such constraints may include limits such as (1) the total amount of flash allocated cannot exceed the flash memory available 170, and (2) the total write rate to the flash does not exceed the given write rate bound 160. Using the data read rate distributions 150, embodiments of an optimization problem may be configured or otherwise created to determine an optimal or maximized read rate from a limited pool of flash memory.

Limiting flash write rates may help avoid flash memory wear out and may also reduce the impact of flash writes on read latencies because flash write operations are slower than flash read operations. For embodiments where memory wear out and/or read latency is not a concern, a limit on fast memory write rates may not be applicable.

In some embodiments, a flash write rate may be limited by either limiting workloads which have data in flash or by writing only a fraction of each workload's new data into flash. A workload may be a discrete or specified portion of data processing operation, including data reads and data writes, associated with a particular user, application, and/or file group. In the embodiment shown, flash write rates are limited through the flash write probability. By setting a flash write probability and then, for each new file, deciding randomly, based on that probability, whether to insert the new file into flash, the flash write rate may be controlled across a data center or other file storage or management system.

In some embodiments, a flash write probability may be calculated as part of an optimization solution 180 for a set of workloads. In some variations, this may be calculated to determine an optimal or preferred ratio of total or upper bound read/write rate (which may be expressed as TOPS—input/output operations per second) to overall storage capacity (which may be expressed in any data storage unit—such as, for example gigabytes or GB). In one embodiment, the optimization problem for the workloads may be expressed as follows:

a. Given a set of workloads; for each workload i is given the total data $c_i$, a piecewise linear cacheability function $r_i(x)$ for all values of x between 0 and $c_i$, (inclusive), and a priority weight $\rho_i$.

b. A bound on the total flash capacity C

For each workload, i, it is therefore desired to find the allocated flash capacity x, between 0 and $c_i$ maximizing the total priority weighted flash read rate $\Sigma_i \rho_i r_i(x_i)$ subject to the constraint that total flash capacity across all workloads cannot exceed C.

Letting the segments of the piecewise linear function $r_i$ be $a_{i,j}+b_{i,j}x$ for $j=1 \ldots n_i$, since $r_i$ is concave it can be expressed as the minimum of the functions corresponding to its linear segments:

$$\rho_i r_i(x) = \min_{1 \le j \le n_i} \{a_{i,j} + b_{i,j}x\}$$

Then by replacing $\rho_i r_i(x)$ with the variable $y_i$, the task can be transformed into a linear program to compute the maximum of the sum of all $y_i$ across all workloads such that, for each workload i and each segment j the following conditions are met:

$$y_i \le a_{i,j} + b_{i,j}x_i$$

$$\sum_i x_i \le C$$

$$0 \le x_i \le c_i$$

The above does not address issues of controlling flash read and write rates, however. As noted above, limiting flash write rates helps avoid flash wearout. This also reduces the impact on flash read latency since flash cannot be read while it is being written to. Optimizing flash allocation to maximize flash reads while limiting flash writes is therefore a desirable objective as that improves data access speed and increases the expected usable lifetime of the flash memory.

The cacheability function for a workload may be non-concave if the read rate increases some time after a file is created. In some embodiments, this may be realized by a workload that begins processing data logs with some delay after the logs are created. Although the embodiment shown below only considers insertion into flash upon write, making the write rates per workload independent of flash allocation and therefore also allowing the priority weights to be ignored, the manner of extending the solutions shown herein to cover such aspects should be readily apparent.

As illustrated and discussed above with respect to FIG. 1b write rate can be controlled either by limiting the workloads that have data in flash or by writing only a fraction of each workload's new data into flash. Setting a write probability allows for the latter solution, which allows for a higher flash read rate while keeping the flash write rate low. The optimization problem for bounded flash write rate allocation may be based on the following a. A set of workloads, for each workload i is given then total data $c_i$, a piecewise linear cacheability function $r_i$: $[0,c_i]$ →R, and a write rate $w_i$
b. A bound on the total flash write rate W
c. A bound on the total flash capacity C
d. For each workload i, the allocated flash capacity $x_i$ (which has a value between 0 and $c_i$, inclusive) and the flash write probability $p_i$ (which has a value between 0 and 1, inclusive) needs to be found maximizing the total flash read rate $$\sum_i p_i r_i\left(\frac{x_i}{p_i}\right)$$

and subject to the constraints of the total flash write rate and total flash capacity While this problem has linear constraints, the objective may not be linear. By relaxing the constraint on the write rate via Lagrangian relaxation and then removing the dependence on the write probability $p_i$ in the objective function, the objective can be linearized as follows $$\max \sum_i p_i r_i\left(\frac{x_i}{p_i}\right)$$
$$\text{s.t.} \sum_i p_i w_i \leq W$$
$$\sum_i x_i \leq C$$
$$0 \leq x_i \leq c_i \text{ for each workload } i$$
$$0 \leq p_i \leq 1 \text{ for each workload } i$$

Using Lagrangian relaxation to relax the constraint on the write rate $\Sigma_i p_i w_i \leq W$ and subtracting the write rate to the objective function with a write penalty factor λ greater than or equal to zero give the relaxed problem an objective as follows:

$$\max \sum_i p_i r_i\left(\frac{x_i}{p_i}\right) - \lambda p_i w_i$$

An optimal solution for the relaxed problem that has a total write rate equal to the bound on the write rate is an optimal solution of the linearized objective. A binary search may then be performed for the best λ. To solve the relaxed optimization problem for a given write penalty λ, it may be preferable to precompute, for each workload i, how much it contributes to the objective function depending on the allocated flash size x for the workload. This may enable removing a dependence on the write probability as follows:

$$h_i^\lambda(x) = \max_{0 \leq p \leq 1} p r_i\left(\frac{x}{p}\right) - \lambda p w_i$$
$$= \max_{0 \leq p \leq 1} p\left(r_i\left(\frac{x}{p}\right) - \lambda w_i\right)$$
$$= \max_{z \geq x} \frac{x}{z}(r_i(z) - \lambda w_i)$$
$$= x \max_{z \geq x} \frac{r_i(z) - \lambda w_i}{z}$$

The function $r_i$ is given as a piecewise linear function from the histograms, and therefore $f(x)=r_i(x)-\lambda w_i$ is also piecewise linear. The max expression $\max_{z \geq x}$ needs to be evaluated only for z that are turning points of the piecewise linear function. Furthermore, if there are two turning points $z_1$ and $z_2$, with $z_1 < z_2$ and the max expression for $z_1$ being less than or equal to $z_2$, the $z_1$ turning point can be ignored because it is dominated by $z_2$. From an application standpoint, this means that it would be better to store a fraction of the youngest data, which would have a size of $z_2$ at a write probability of 1 than a fraction of the data which would have a size of $z_1$ at write probability 1.

By processing the turning points of the function $r_i$ in decreasing x-coordinate, the function h can be computed in linear time. In most cases the function is concave. If it is not, the concave upper bound can be computed simply by removing some turning points of the piecewise linear function.

The function h can be rewritten as the minimum of the linear functions corresponding to the linear segments to get an optimization problem of the same form as $p_i r_i(x)$. The linear program is solved directly by starting with the solution $x_i=0$, $y_i=0$, for each workload i and then by successively increasing the allocated flash $x_i$ of the workload that has the highest increase in the objective function as long as flash can be allocated. The algorithm has a run time complexity of O(n k log k) where n is the maximum number of pieces of the piecewise linear function $r_i$ and k is the number of the workloads.

In some embodiments, a time to live (TTL) may be estimated for each file or file group in flash based on the optimization results. The TTL is a representation or estimate of how long a file inserted into flash will live there before being moved to disk.

The optimization results 115 indicating the computed flash write probability and, in some embodiments, the TTL values, may then be communicated to the file management system or storage management system 155 for implementation and/or application to the data read 175 and write 165 operations being governed or otherwise administered thereby. In some embodiments, other preferred or suggested flash behaviors or memory allocations may also be included in the optimization results 115 communicated to the file management system or storage management system 155.

Upon receiving the optimization results 115, the file/storage management system 155 may reset the flash memory allocations 185 for each file group to the amounts recommended by the optimization. In some embodiments, the storage management system or file management system may manage the flash for each file group separately using a FIFO (first in first out) eviction policy. In other embodiments, different files in a file group may have different TTL values. In some embodiments, a file's may be based on characteristics beyond its file group's TTL. One such embodiment may vary TTL for files based on file size such that different file sizes or size ranges may be subject to different eviction protocols. In such embodiments, a modified FIFO eviction policy taking based on TTL may be employed, or a policy based purely on TTL.

If a TTL is provided for the file group, files from each file group may be moved to disk 145 when their ages exceed the group's TTL. In some embodiments, files may be evicted from flash with their ages exceed their group's TTL as of the time the file was created. In some embodiments, eviction may take place at some point after TTL expiration based on a scanner process periodically inspecting files to determine which ones have met or exceeded their TTL and are therefore subject to eviction. In other embodiments, such a scanner may evict files whose TTL is set to expire before the next schedule scan or at some point in time between the current scan time and the next scan time. In some embodiments, this provides an approximate FIFO policy. If the amount of flash space allocated 185 for a file group is exceeded, additional writes to flash 135 may be blocked until space becomes available. The TTL for a given file or file group may be computed from the flash allocated 185 to a particular workload and that workload's write rate. In some embodiments, the set TTL for a given file or file group may be updated when flash allocations are updated. In embodiments where a set TTL is not further updated when flash allocations are updated, an arriving file creation request 165 may sometimes find the flash storage full, requiring that the arriving request be written to disk 145 regardless of whether it would have otherwise been written to flash.

In embodiments where a TTL is not provided, then the storage management system may maintain per file-group FIFO queues of the files in flash memory and evict them to disk as needed to maintain the flash allocation limit to the file group. In some embodiments, the file system may make a copy of the flash data onto disk at some time between file creation and eviction from flash. In such embodiments, eviction may entail only deleting the data from flash and updating any relevant tables to indicate where the data is located to point to the disk location.

In some embodiments, when files in a file group are created 165, a pseudo-random binary value may be drawn that has a probability equal to the file group's write probability 125. If the value is 1, the file is placed in the flash memory 135, otherwise it is placed in disk 145, and the system notes its location for subsequent data read operations 175. In some embodiments, allocation of flash memory may be done in the context of a replicated file system 155. In such embodiments, only one copy of multiple replicated versions of file may be stored in flash 135.

In some embodiments, such optimized flash allocation 185 is only used for files that are created and is not being used for stored file access. This is because unlike stored files, files that are created have a much higher probability of being read or otherwise accessed immediately after creation. In some embodiments, such allocation of flash to created files behaves like a form of pre-emptive file caching—putting files in flash cache before they are read. Whereas traditional caches will insert data into flash either on write or read or both—such pre-emptive caching embodiments perform insertion of files into flash memory only on write.

Although data read rates may be analyzed, in some embodiments files or file groups or portions thereof may be inserted into flash 135 only during data write 165. This is based on the assumption that data is typically read 175 shortly after it is written 165. Especially in embodiments having distributed storage solutions, an insertion on write policy is computationally cheaper and faster than an insertion on read policy.

In some embodiments, units of data storage capability in a distributed data center may be regarded as storage servers. Each storage server may include a mix of disk and flash memory or other combination of slow and fast access memory options. Because data access may occur directly between a storage server and a requesting entity (e.g. an application or user), and because each storage server may have a different amount of flash memory (or, in some cases, no flash memory at all), an insertion on read policy that does not rely on the requesting entity for write-back must perform an additional I/O read in order to place data into flash memory. Furthermore, even if there is write-back, such write-back requires reading the data from disk, transferring the read data over a network connection, and finally writing the transferred data into flash. By contrast, an insertion on write policy simply requires identification of suitable flash memory storage during data write and then writing the data to the identified flash memory.

Furthermore, embodiments performing insertion on write may be more efficient because insertion on write avoids having to read the data off of disk. In such embodiments, there is a direct relationship between the data being uploaded/added to a data center and the rate of writes to the flash memory portion. Because flash memory may wear out after a certain number of write operations, it may be advantageous to have more direct control over flash memory write rates. Insertion on read is not as conducive to controlling flash memory write rates because it requires an awareness of stored memory access as well as file/data creation operations.

In some embodiments, flash memory may be allocated 185 for a user when a user signs on or otherwise indicates an intent to use a data and/or storage center and has a past record of activity in that data/storage center or in a system managing some or all of that data/storage center or multiple data/storage centers. Based on sample traces of past activity system-wide 130, the optimization engine 190 can provide the data/storage center and/or management system 155 with optimization parameters 115 for how to allocate flash memory 185 for that user and for all other current users of the system. In embodiments having a limited pool of flash memory available, the optimization parameters 115 will tend to affect all system users because an allocation of more flash to one user may mean an allocation of less flash to another. Therefore in some such embodiments, traces of past activity may be analyzed for every user that can be identified in the traces and/or for every active user having an associated activity trace.

In some embodiments, when a user attempts file creation via a data write operation 165 either directly at the data/storage center or via an application that stores files at the data/storage center, a new file is requested from the data/storage center. As part of a file creation process, the data/storage center or management system may apply the write probability calculation 125 determined by the optimization engine and return a flash memory location to the user or application. Copies of data are then written into locations, and, upon conclusion of writing, one of those copies may end up written to flash based on the flash allocation scheme currently in use on the system.

Figure 1C:
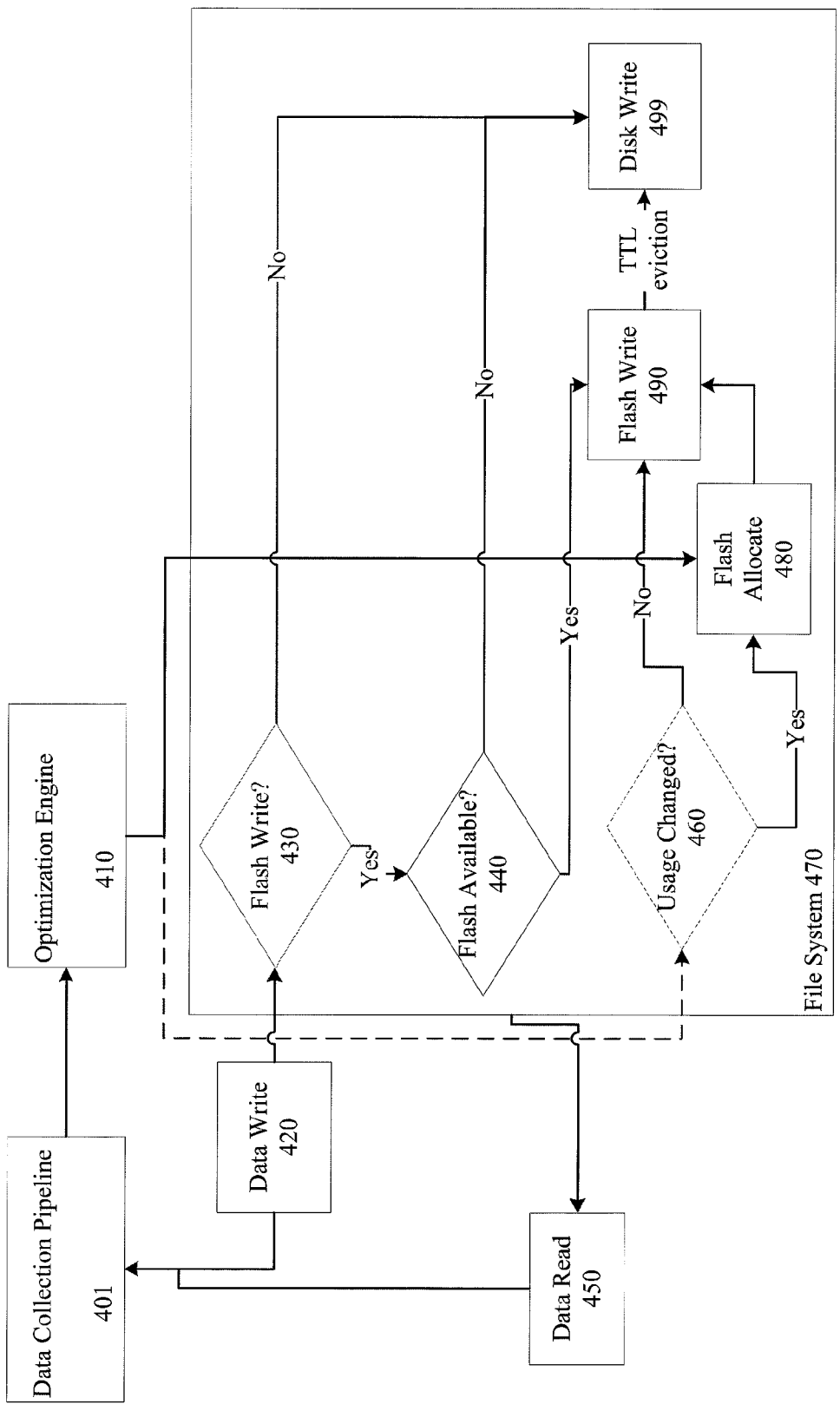
FIG. 1c shows a block diagram of an embodiment of a flash data write process as described herein.

FIG. 1c shows an embodiment of a flash data write and re-allocation process as described herein. Data read 450 and data write 420 operations are either sampled or otherwise monitored and detected by the data collection pipeline 401 to create the histograms for the optimization engine 410, which may provide updated flash allocation, write probabilities, and/or flash TTL settings to the file system 470.

The write operation 420 may be a request to place data into flash memory. The data may be a request to create one or more new files as part of a workload, a request to load or otherwise access previously stored data, or a request to modify data already stored by the system. If the data write 420 is associated with a workload that has a flash write probability, that write probability may be applied to determine whether the data should be written to flash 430. If the flash write probability indicates a disk write 499, the data is written to disk and the file system 470 moves to the next data write 420. In some embodiments, a data write request 420 that does not have a flash write probability associated therewith may be assumed to have a flash write probability of zero.

If the flash write probability applied indicates that the data should be written to flash 430, it is next determined if there is in fact any allocable flash memory available 440 to accommodate the data write request. If there is no allocable or available flash memory 440, the write request is written to disk 499. Otherwise, the write request is written to flash memory 490.

In some embodiments, parallel to the flash memory writing process, the optimization engine 410 is passing allocation, write probability, and/or TTL data directly to a flash memory allocation portion 480 of the file system 470. The flash memory allocation portion 480 may govern the way in which a flash write 490 may be performed in terms of an amount of allocated flash memory or a TTL such that data that might have otherwise been written to flash 490 may instead be written to disk 499 or data may be subject to TTL eviction from flash to disk at a shorter or longer time interval. Also, the flash allocation 480 may govern the flash write probability that makes a determination whether to write to flash at all 430.

In some embodiments, the optimization engine 410 may feed these parameters to another monitoring portion of the file system that looks at memory usage 460 and determines if flash or disk memory usage has changed 460 more than a predetermined or threshold amount over a particular time period. If the usage is not determined to have changed 460, the file system 470 continues to perform flash writes 490 and disk writes 499 according to the previously calculated allocation, write probability, and/or TTL scheme. If usage is determined to have changed 480 by more than a certain threshold amount either in a given time period or in total, the flash allocation portion 480 of the file system may be invoked to re-allocate flash memory and set new write probability and TTL parameters.

Although discussed in relation to an internet- or network-accessible data center environment having one or more clients, such a flash memory allocation solution may be applicable to other environments as well. In one exemplary embodiment of a network-based data center, some measure of storage capacity in a cloud-based or distributed system may be hosted or otherwise managed in the manner shown in FIG. 2a. In the figure shown, the storage capacity may reside within a data center 1040 comprised of one or more physical and/or virtual computing devices operably configured to have or have access to some or all of a pool of storage capacity. In some embodiments, the data center 1040 may be a module, set of modules, server, or set of servers that stores and controls access to the distributed computing and data storage environment. In some exemplary embodiments, the data center 1040 may correspond to one or more physical and/or logical processing modules or computing devices operably connected or configured to share information. In some embodiments, the data center 1040 may grow or shrink to occupy multiple and/or partial portions of various logical or physical processing modules available in one or more logical or physical locations. In some embodiments, a logical processing module may be created from one or more physical processing modules or portions thereof within a data center 1040 or across multiple data centers.

In some embodiments, services or features such as data read and write, database connections, and/or back-up and maintenance may be handled or otherwise managed through a data I/O request 1060 capability in the data center or associated with the data center.

In exemplary embodiments of large-scale distributed data storage or data processing environments where authentication services may be offered as part of the system infrastructure, a connecting entity designating a client 1010, may initiate and conduct communications with a provisioned communication gateway 1030 via a network or internet connection as an initial step in accessing the data center 1040 via the data I/O request 1060 capability. Exemplary embodiments of such provisioning may, for purposes of facilitating a secure computing environment and discreet handling of data, enforce encryption of communication channels using strong authentication mechanisms, compartmentalized handling, processing, and storage of data, as well as exhaustive application of system hardening techniques that include documented, routine maintenance of system and application patches, monitored and access-restricted ingress and egress network ports and services, and lastly routine reviews of system and security logs. Further exemplary embodiments of such provisioned communication gateways may implement additional functionality such as load balancing across one or more applications in a cloud computing environment—either within a cloud or across multiple clouds.

In some exemplary embodiments, the gateway 1030 may be in a demilitarized zone (DMZ) between the internet and the data center 1040. In the exemplary embodiment shown, the client 1010, which may be one of any number of clients 1010, 1020 (existing on any number of separate client networks), connects to the data center 1040 via the gateway 1030. At or shortly after connection, the flash memory allocation capability 1050 of the data center recognizes the client 1010 and looks at any additional information related to the client, such as financial data or remote profile information or any relevant data for particular documents, features, or information types being managed or utilized by the system. Such additional information may be accessed or provided either within the computing environment or, in the case of external data, via an external service transaction handler (not shown). In some exemplary embodiments, multiple external service transaction handlers may reside on one or more service provider domain networks.

In some exemplary embodiments, the DMZ may include an authentication mechanism for authenticating users and, in some exemplary embodiments, generating a session token. In some exemplary embodiments, the transaction handler may be part of an overall transaction management solution used across a range of services, including payment for computing resources. The data center 1040 and, in some exemplary embodiments, any associated sub-systems may be embodied in one or more groups of computing devices of the type shown in FIG. 2b.

Figure 2B:
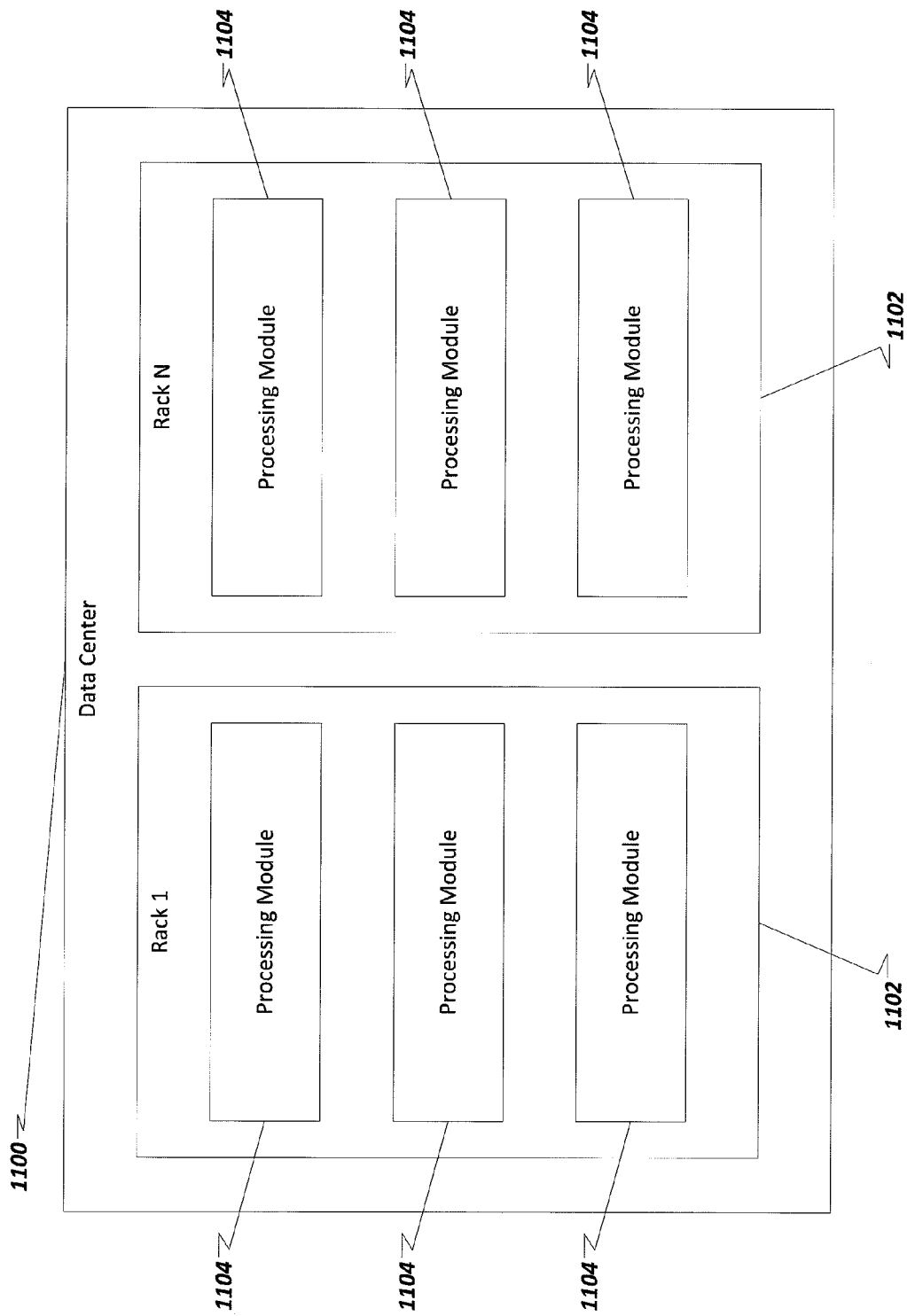
FIG. 2b shows a block diagram of an embodiment of a data center suitable for a flash memory allocation process as described herein.

As noted above, the processing elements of a data center may be embodied as part of, all of, or multiple computing devices or groups of computing devices. FIG. 2b is a block diagram illustrating an example of a datacenter (1700). The data center (1700) is used to store data, perform computational tasks, and transmit data to other systems outside of the datacenter using, for example, a network connected to the datacenter. In particular, the datacenter (1700) may perform large-scale data processing on massive amounts of data.

The datacenter (1700) includes multiple racks (1702). While only two racks are shown, the datacenter (1700) may have many more racks. Each rack (1702) can include a frame or cabinet into which components, such as processing modules (1704), are mounted. In general, each processing module (1704) can include a circuit board, such as a motherboard, on which a variety of computer-related components are mounted to perform data processing. The processing modules (1704) within each rack (1702) are interconnected to one another through, for example, a rack switch, and the racks (1702) within each datacenter (1700) are also interconnected through, for example, a datacenter switch.

A rack can include storage, like one or more network attached disks or arrays of flash memory in the form of solid-state drives, that is shared by the one or more processing modules (1704) and/or each processing module (1704) may include its own storage such as a local hard drive or local flash memory. Additionally, or alternatively, there may be remote storage connected to the racks through a network. The processing module (1704) may be a computing device such as a rack computer, a server, or any other suitable form of computing device. In some embodiments, the processing module (1704) may be associated with volatile and/or non-volatile storage. Non-volatile storage may include one or more hard drive(s) or portions thereof, optical storage devices and/or media, tape storage devices and/or media, magnetic storage devices and/or media, solid-state memory, flash memory and other computer-accessible storage media and/or devices capable of storing data for later retrieval in both powered-on and powered-off states. Volatile storage may include RAM chips, memory registers, buffers, and other computer-accessible storage capable of storing data for retrieval only in a powered-on state.

The datacenter (1700) may include dedicated optical links or other dedicated communication channels, as well as supporting hardware, such as modems, bridges, routers, switches, wireless antennas and towers. The datacenter (1700) may include one or more wide area networks (WANs) as well as multiple local area networks (LANs).

A processing module (1704) may represent an application server that hosts one or more applications. An application server may have multiple applications running simultaneously thereon, and may have multiple copies or "instances" of an application running. Applications may include file system management and optimization engine features of the type described above.

A data center (1700) may have multiple applications running in application servers within the data center. In some embodiments, an application server in a data center may correspond to one or more physical and/or logical processing modules (1704). In some embodiments, a logical application server may grow or shrink to occupy multiple and/or partial portions of a physical processing module (1704). In such embodiments, some or all of the processing modules (1704) in a data center may be standardized or otherwise have known physical arrangements whereas a logical application server created from one or more processing modules and/or from fragments/portions of a processing module may emulate hardware properties that are not otherwise physically present in the data center.

In some embodiments, a processing module may include a physical or logical data processor. A physical data processor may include data processing chips such as, for example, a chip having an x86 architecture or a chip having an ARM (Advanced RISC Machine) architecture. A logical data processor may include an emulator or other logical data processing entity simulating behavior of a computer processor that may or may not otherwise be present or available in the data center.

Figure 2C:
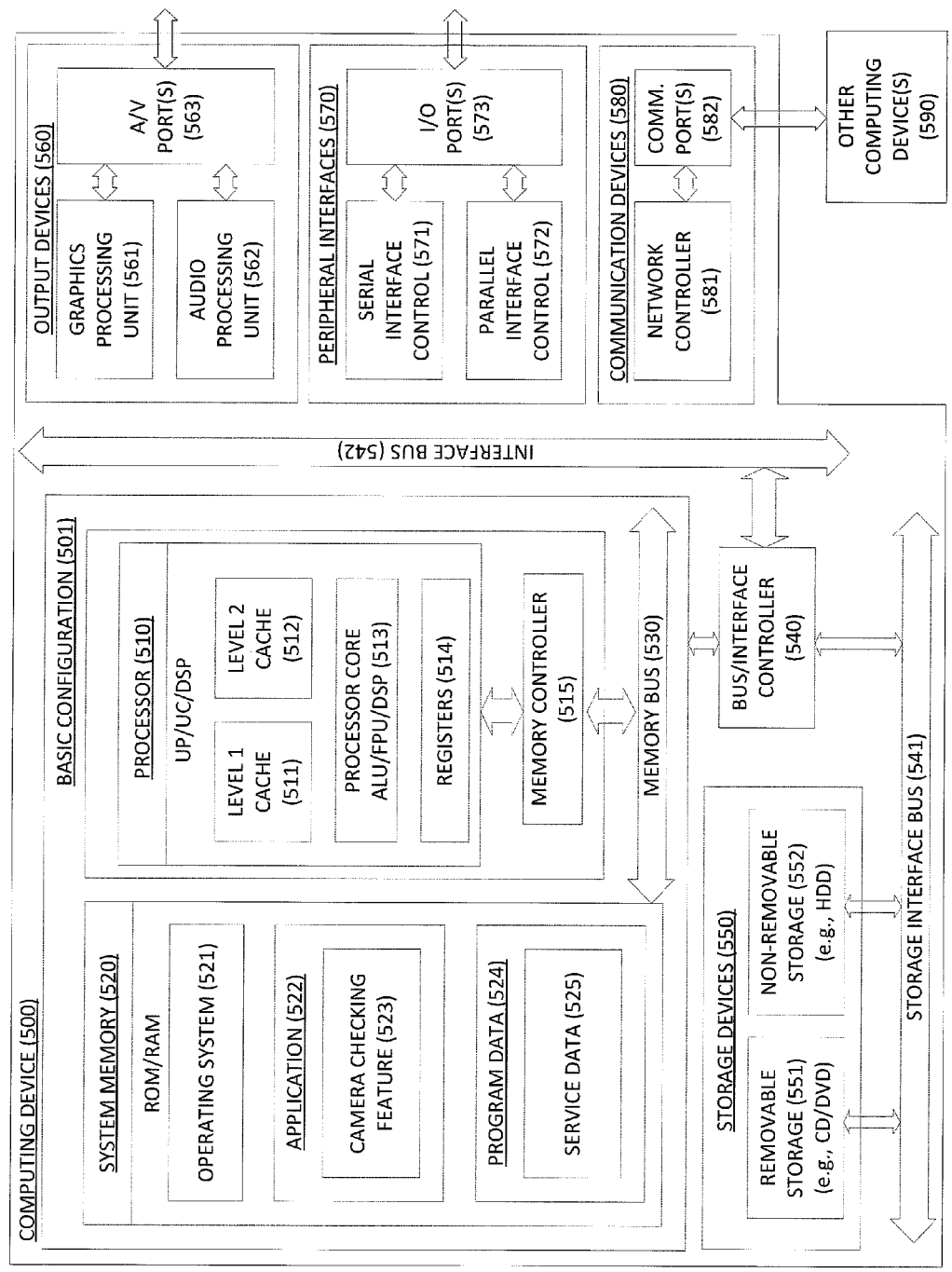
FIG. 2c shows an embodiment of a computing system configured to operate in or administer part or all of a flash memory allocation process as described herein.

FIG. 2c is a block diagram illustrating an example computing device 500 that is arranged to perform flash memory allocation as described herein. In a very basic configuration 501, computing device 500 typically includes one or more processors 510 and system memory 520. A memory bus 530 can be used for communicating between the processor 510 and the system memory 520.

Depending on the desired configuration, processor 510 can be of any type including but not limited to a microprocessor (µP), a microcontroller (µC), a digital signal processor (DSP), or any combination thereof. Processor 510 can include one more levels of caching, such as a level one cache 511 and a level two cache 512, a processor core 513, and registers 514. The processor core 513 can include an arithmetic logic unit (ALU), a floating point unit (FPU), a digital signal processing core (DSP Core), or any combination thereof. A memory controller 515 can also be used with the processor 510, or in some implementations the memory controller 515 can be an internal part of the processor 510.

Depending on the desired configuration, the system memory 520 can be of any type including but not limited to volatile memory (such as RAM), non-volatile memory (such as ROM, flash memory, etc.) or any combination thereof. System memory 520 typically includes an operating system 521, one or more applications 522, and program data 524. Application 522 may include a memory checking/allocation feature 523 that is arranged to perform flash memory allocation and/or data read rate sampling as described herein. Program Data 524 may include historical data such as activity traces and other logs of application or user activity or samples thereof. In some embodiments, application 522 can be arranged to operate with program data 524 on an operating system 521 such that the overall system performs one or more specific variations of memory analysis or allocation techniques as discussed herein. This described basic configuration is illustrated in FIG. 4 by those components within line 501.

Computing device 500 can have additional features or functionality, and additional interfaces to facilitate communications between the basic configuration 501 and any required devices and interfaces. For example, a bus/interface controller 540 can be used to facilitate communications between the basic configuration 501 and one or more data storage devices 550 via a storage interface bus 541. The data storage devices 550 can be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), flash memory, and tape drives to name a few. Example computer storage media can include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of device 500.

Computing device 500 can also include an interface bus 542 for facilitating communication from various interface devices (e.g., output interfaces, peripheral interfaces, and communication interfaces) to the basic configuration 501 via the bus/interface controller 540. Example output devices 560 include a graphics processing unit 561 and an audio processing unit 562, which can be configured to communicate to various external devices such as a display or speakers via one or more A/V ports 563. Example peripheral interfaces 570 include a serial interface controller 571 or a parallel interface controller 572, which can be configured to communicate with external devices such as input devices (e.g., keyboard, mouse, pen, voice input device, camera, touch input device, etc.) or other peripheral devices (e.g., printer, scanner, etc.) via one or more I/O ports 573. An example communication device 580 includes a network controller 581, which can be arranged to facilitate communications with one or more other computing devices 590 over a network communication via one or more communication ports 582.

The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Figure 2D:
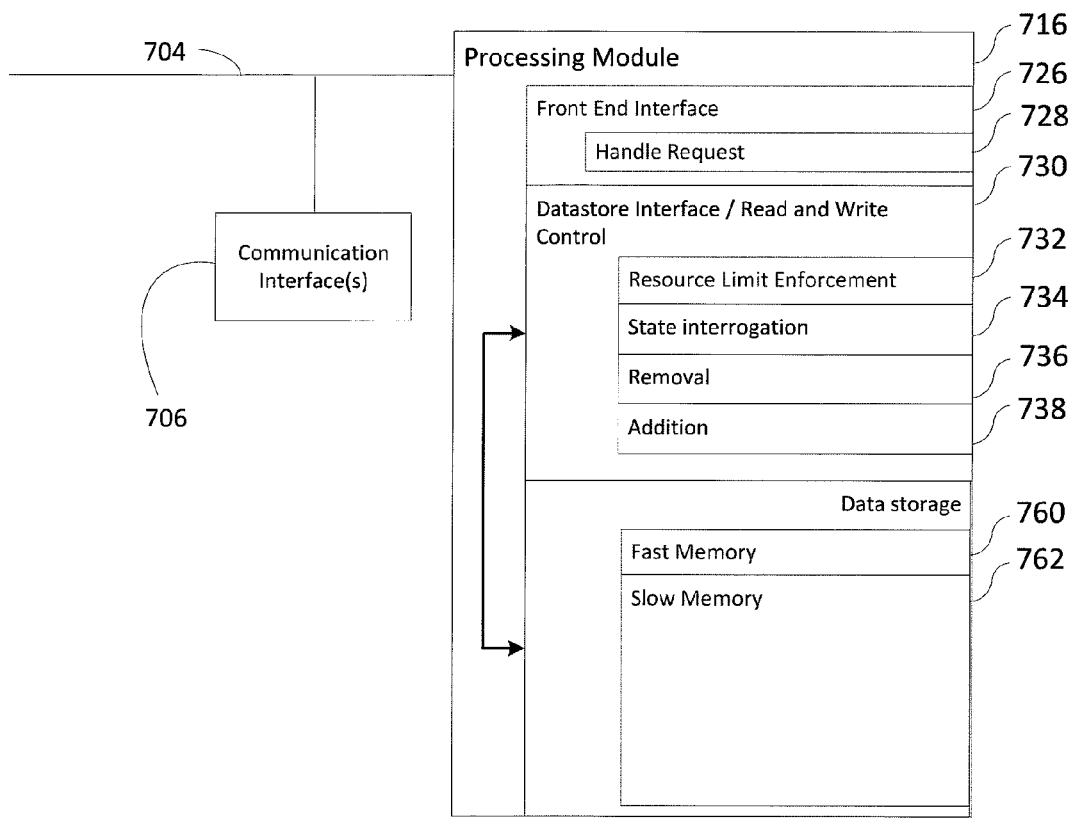
FIG. 2d shows an embodiment of a computing system configured to operate in or administer part or all of a flash memory allocation process as described herein.

Computing device 500 can be implemented as part or all of a physical or logical data server device such as a processing unit as described above. An embodiment of a logical representation of a data server device configured to perform allocation and access of slow and fast memory as described herein is shown in FIG. 2d.

In the embodiment shown, a data I/O pathway 704 may connect the data server device or module 716 to one or more other data server devices and/or to a source of data read and/or data write requests. Such data read and write requests may be processed by a communication interface 706 associated with the data processor module 716. The data processor module 716 may be equipped with a front end interface portion 726 that handles an incoming data read or data write request 728. The front end interface portion may be operably connected to a data storage interface portion 730 that performs resource limit enforcement 732, state interrogation 734, data removal 736 and data addition 738 operation. Resource limit enforcement may be related to configurable or pre-set limits on available total memory and/or available flash memory 760 in a data storage portion associated with the data store interface 730. In some embodiments, resource limit enforcement 732 may also include limiting a total number of read or write operations or a memory read and/or write rate to extend the usable life of flash memory. State interrogation 734 may be associated with determining and sampling an allocation state of flash memory 760 and/or data read operations associated with either flash memory 760 or disk memory 762. Data removal 736 may be associated with either deletion of data or eviction of data from flash memory 760 to disk 762 based on a TTL associated with a particular file or workload. Data addition 738 may be associated with writing new files to either flash 760 or disk 762 depending on the flash allocation policy and flash write probability established for the processor module 716, workload, file group, user, and/or application in question.

In some cases, little distinction remains between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/ or quantities). A typical data processing system may be implemented utilizing any suitable commercially available components, such as those typically found in data computing/ communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Only exemplary embodiments of the systems and solutions discussed herein are shown and described in the present disclosure. It is to be understood that the systems and solutions discussed herein are capable of use in various other combinations and environments and are capable of changes or modifications within the scope of the concepts as expressed herein. Some variations may be embodied in combinations of hardware, firmware, and/or software. Some variations may be embodied at least in part on computer-readable storage media such as memory chips, hard drives, flash memory, optical storage media, or as fully or partially compiled programs suitable for transmission to/download by/installation on various hardware devices and/or combinations/collections of hardware devices. Such variations are not to be regarded as departure from the spirit and scope of the systems and solutions discussed herein, and all such modifications as would be obvious to one skilled in the art are intended to be included within the scope of the following claims:

The invention claimed is:

1. A method of allocating memory resources from a fixed pool of fast access memory within a data center having a data storage area equipped with slow access memory and the fixed pool of fast access memory, the method comprising:
  receiving a data write request to write data in the data storage area of the data center;
  identifying a file group associated with the received data write request;
  analyzing previous data activity traces associated with the identified file group;
  determining an available fast access memory amount based on the total amount of fast access memory in the fixed pool and a currently allocated amount of fast access memory;
  determining a maximum permitted memory write rate for the fast access memory that establishes an upper bound on how much data may be written to the fast access memory within a given time period;
  solving an optimization problem based on the analyzed trace data, the total amount of available fast access memory, and the maximum permitted memory write rate in order to determine a fast access memory write probability and a fast access memory allocation amount for the identified file group; and
  providing the fast access memory write probability and fast access memory allocation amount to a file system of the data center such that the file system determines whether to evict data previously written in the fast access memory allocated to the identified file group based on the determined fast access memory allocation amount and determines how to perform the data write request based on the determined fast access memory write probability.

2. The method of claim 1, further comprising:
  determining a time to live (TTL) value that governs how long data from the write request that is written to the fast access memory included in the determined fast access memory allocation amount may remain in the fast access memory before being evicted to the slow access memory.

3. The method of claim 1, said analyzing previous data activity traces includes analyzing previous data activity of a user or application associated with the identified file group.

4. The method of claim 1, said analyzing previous data activity traces including:
  collecting samples of data operations representing data read and data write activity for files within the data center;
  identifying, within the samples, the file group associated with each sampled data operation;
  generating, for each file group, histograms comparing file age to file size and comparing file age to a number of read operations associated with a file; and
  creating a data activity trace for a particular file group based on the generated histograms.

5. The method of claim 4, said analyzing previous data activity traces associated with the identified file group further comprising analyzing all created data activity traces for all file groups currently associated with an allocated amount of fast access memory from the fixed pool.

6. The method of claim 1, where the file system is a replicated file system that writes two or more copies of the data of the write request in response to the data write request; and
  the method further comprising:
  determining, based on the fast access memory write probability, whether any one of the two or more copies should be written to fast access memory; and
  writing only one of the two or more copies to fast access memory in response to determination that one of the two or more copies should be written to fast access memory.

7. The method of claim 2, where the fast access memory is flash memory and the slow access memory is disk memory; and
  the method further comprising evicting the written data from flash memory and writing the evicted data to disk memory when the TTL associated with the written data expires.

8. The method of claim 6, where the fast access memory is flash memory and the slow access memory is disk memory; and
  the method further comprising writing at least one of the two or more copies of the data of the write request to disk memory in response to the data write request.

9. The method of claim 1, where the optimization problem is a linear programming problem.

10. The method of claim 1, said solving an optimization problem based on the previous data activity traces including predicting an available number of fast access memory reads based on an amount of total memory allocated to the identified file group.

11. The method of claim 1, where the file system is a parity-encoded file system where parity-encoded data is data that is stored with parity codes to provide redundancy, and where the fast access memory write probability is applied to a data or systematic portion of the parity-encoded data; and
the method further comprising:
determining, based on the fast access memory write probability, whether the data or systematic portion of the parity-encoded data should be written to fast access memory; and
writing the data or systematic portion of the parity-encoded data to fast access memory in response to determination that the data or systematic portion of the parity-encoded data should be written to fast access memory.

12. The method of claim 11, said determining, based on the fast access memory write probability, whether the data or systematic portion of the parity-encoded data should be written to fast access memory further including:
determining whether at least some of the parity codes associated with the data or systematic portion should be written to fast access memory along with the data or systematic portion; and
said writing the data or systematic portion of the parity-encoded data to fast access memory including writing said at least some of the parity codes to fast access memory in response to a determination that at least some of the parity codes associated with the data or systematic portion should be written to fast access memory along with the data or systematic portion.

13. A system comprising
a processor disposed within a data center;
a data storage area disposed within the data center, the data storage area including a pool of slow-access memory and a fixed-size pool of fast-access memory; and
a processor-readable memory having embodied thereon instructions causing the processor to perform a method of allocating memory resources from the fixed pool of fast access memory, the method comprising:
receiving a data write request to write data in the data storage area of the data center;
identifying a file group associated with the received data write request;
analyzing previous data activity traces associated with the identified file group;
determining an available fast access memory amount based on the total amount of fast access memory in the fixed pool and a currently allocated amount of fast access memory;
determining a maximum permitted memory write rate for the fast access memory that establishes an upper bound on how much data may be written to the fast access memory within a given time period;
solving an optimization problem based on the analyzed trace data, the total amount of available fast access memory, and the maximum permitted memory write rate in order to determine a fast access memory write probability and a fast access memory allocation amount for the identified file group; and
providing the fast access memory write probability and fast access memory allocation amount to a file system of the data center such that the file system determines whether to evict data previously written in the fast access memory allocated to the identified file group based on the determined fast access memory allocation amount and determines how to perform the data write request based on the determined fast access memory write probability.

14. The system of claim 13, further comprising:
determining a time to live (TTL) value that governs how long data from the write request that is written to the fast access memory included in the determined fast access memory allocation amount may remain in the fast access memory before being evicted to the slow access memory.

15. The system of claim 13, said analyzing previous data activity traces includes analyzing previous data activity of a user or application associated with the identified file group.

16. The system of claim 13, said analyzing previous data activity traces including:
collecting samples of data operations representing data read and data write activity for files within the data center;
identifying, within the samples, the file group associated with each sampled data operation;
generating, for each file group, histograms comparing file age to file size and comparing file age to a number of read operations associated with a file; and
creating a data activity trace for a particular file group based on the generated histograms.

17. The system of claim 16, said analyzing previous data activity traces associated with the identified file group further comprising analyzing all created data activity traces for all file groups currently associated with an allocated amount of fast access memory from the fixed pool.

18. The system of claim 13, where the file system is a replicated file system that writes two or more copies of the data of the write request in response to the data write request; and
the method further comprising:
determining, based on the fast access memory write probability, whether any one of the two or more copies should be written to fast access memory; and
writing only one of the two or more copies to fast access memory in response to determination that one of the two or more copies should be written to fast access memory.

19. The system of claim 14, where the fast access memory is flash memory and the slow access memory is disk memory; and
the method further comprising evicting the written data from flash memory and writing the evicted data to disk memory when the TTL associated with the written data expires.

20. The system of claim 18, where the fast access memory is flash memory and the slow access memory is disk memory; and
the method further comprising writing at least one of the two or more copies of the data of the write request to disk memory in response to the data write request.

21. The system of claim 13, where the optimization problem is a linear programming problem.

22. The system of claim 13, said solving an optimization problem based on the previous data activity traces including predicting an available number of fast access memory reads based on an amount of total memory allocated to the identified file group.

23. The system of claim 13, where the file system is a parity-encoded file system where parity-encoded data is data that is stored with parity codes to provide redundancy, and where the fast access memory write probability is applied to a data or systematic portion of the parity-encoded data; and the method further comprising:

determining, based on the fast access memory write probability, whether the data or systematic portion of the parity-encoded data should be written to fast access memory; and writing the data or systematic portion of the parity-encoded data to fast access memory in response to determination that the data or systematic portion of the parity-encoded data should be written to fast access memory.

24. The system of claim 23, said determining, based on the fast access memory write probability, whether the data or systematic portion of the parity-encoded data should be written to fast access memory further including:

determining whether at least some of the parity codes associated with the data or systematic portion should be written to fast access memory along with the data or systematic portion; and said writing the data or systematic portion of the parity-encoded data to fast access memory including writing said at least some of the parity codes to fast access memory in response to a determination that at least some of the parity codes associated with the data or systematic portion should be written to fast access memory along with the data or systematic portion.

25. A non-transitory processor-readable medium having embodied thereon instructions which, when executed by a processor, cause the processor to perform a method of allocating memory resources from a fixed pool of fast access memory within a data center having a data storage area equipped with slow access memory and the fixed pool of fast access memory, the method comprising:

receiving a data write request to write data in the data storage area of the data center;

identifying a file group associated with the received data write request;

analyzing previous data activity traces associated with the identified file group;

determining an available fast access memory amount based on the total amount of fast access memory in the fixed pool and a currently allocated amount of fast access memory;

determining a maximum emitted memory write rate for the fast access memory that establishes an upper bound on how much data may be written to the fast access memory within a given time period;

solving an optimization problem based on the analyzed trace data, the total amount of available fast access memory, and the maximum permitted memory write rate in order to determine a fast access memory write probability and a fast access memory allocation amount for the identified file group;

and providing the fast access memory write probability and fast access memory allocation amount to a file system of the data center such that the file system determines whether to evict data previously written in the fast access memory allocated to the identified file group based on the determined fast access memory allocation amount and determines how to perform the data write request based on the determined fast access memory write probability.

* * * * *